(12) United States Patent
Niu

(10) Patent No.: US 10,107,381 B2
(45) Date of Patent: Oct. 23, 2018

(54) CHAIN LOAD BINDER

(71) Applicant: Shengliang Niu, Taizhou (CN)

(72) Inventor: Shengliang Niu, Taizhou (CN)

(73) Assignee: ZheJiang Topsun Logistic Control Co., Ltd, Taizhou (CN)

( * ) Notice: Subject to any disclaimer, the term of this patent is extended or adjusted under 35 U.S.C. 154(b) by 369 days.

(21) Appl. No.: 15/017,678

(22) Filed: Feb. 8, 2016

(65) Prior Publication Data
US 2016/0273644 A1  Sep. 22, 2016

(30) Foreign Application Priority Data
Mar. 18, 2015 (CN) .......................... 2015 1 0119058

(51) Int. Cl.
| B60P 7/08 | (2006.01) |
|---|---|
| F16H 57/039 | (2012.01) |
| F16H 19/06 | (2006.01) |

(52) U.S. Cl.
CPC ............ F16H 57/039 (2013.01); B60P 7/083 (2013.01); F16H 19/06 (2013.01)

(58) Field of Classification Search
CPC ....... B60P 7/083; B60P 7/0861; B60P 7/0869; F16H 57/039; B66D 3/26
See application file for complete search history.

(56) References Cited

FOREIGN PATENT DOCUMENTS

CN    200720302861.0    11/2008

*Primary Examiner* — Emmanuel M Marcelo
(74) *Attorney, Agent, or Firm* — Minder Law Group; Willy H. Wong

(57) ABSTRACT

A chain load binder comprising a housing and a sprocket setup in the housing. A worm, a spline shaft, and a worm gear meshing with the worm are also designed within the housing. The sprocket is opposite the worm gear and both ends of the spline shaft are connected to the worm gear and the sprocket respectively. The housing comprises the left half housing and the right half housing connecting to each other. The left half housing is made of non-metal solid material, where the worm and the worm gear are fixed; and the right half housing is made of rubber, where the sprocket is installed. Both ends of the chain stretch out of the bottom of the right half housing. There is an inner steel plate installed inside the right half housing, attaching to its inner surface.

20 Claims, 15 Drawing Sheets

A - A

B - B

CHAIN LOAD BINDER

RELATED APPLICATIONS

This application claims benefit to Chinese Patent Application No. CN201510119058.2, filed Mar. 18, 2015.

The above application and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to the field of mechanical technology, to a tie down device, and particularly to a chain load binder.

Related Art

In logistics operations, cargo needs to be bound, in order to avoid being damaged or lost caused by the bumps or vibrations during the transportation. The chain load binder is such a device used to secure cargo.

As proposed by the applicant, in a prior art device, the chain load binder comprises a housing with an inner cavity. Inside the housing, there is a sprocket able to rotate and wound by a chain. This driving mechanism comprises a rotation handle, a worm, a worm gear and a guiding part. The rotation handle is axially fixed to the housing, the worm gear is connected to the sprocket and the worm is circumferentially fixed to the rotation handle. The guiding part is always embedded into the teeth of the worm when the worm detaches from or meshes with the worm gear.

In the use of the above mechanism of the hand-driven chain load binder, rotating the rotation handle drives the worm to move forward, under the pressure from the guiding part, and to mesh with the worm gear to output a tightening force, and hence tighten the chain to bind cargo. However, there is an issue in the mechanism of the chain load binder. The design purpose of the housing is to support the worm, the worm gear and the guiding part, and in order to achieve a fairly good support, the housing is generally made of metals. It is heavy and easy to impact on other parts and result in big vibrations during the service or transportation, which impacts on the normal working condition of the parts inside the tie down.

SUMMARY OF THE INVENTION

One objective of an embodiment of the invention is to avoid the issues stated above in the prior art, and to provide a chain load binder that cushions the housing from impaction and protects the inner parts.

The above objectives can be achieved by the following technical proposal: A chain load binder comprises a housing with an inner cavity and a sprocket setup inside. A chain winds around the sprocket. A worm, a spline shaft and a worm gear meshing with the worm are also designed in the housing. The sprocket is opposite the worm gear and two ends of the spline shaft are connected to the worm gear and the sprocket respectively. One end of the worm stretches out of the housing side face and on the worm's end there is a rotating part able to be connected to tools, wherein the housing consists of the left half housing and the right half housing connecting to each other. The left half housing is made of metal material, inside which the worm and the worm gear are fixed; and the right half housing is made of non-metal solid material, inside which the sprocket is installed. Both ends of the chain stretch out of the bottom of the right half housing. There is an inner steel plate installed inside the right half housing, attaching to its inner surface. There is also an outer steel plate installed outside the right half housing, attaching to its outer surface. The left half housing and the outer steel plate are secured with fasteners passing through the left half housing, the inner steel plate, the right half housing and the outer steel plate successively.

The left half housing is made of metal material, achieve a good support to the worm and the worm gear, and improve the stability of the present tie down under work condition. The right half housing is made of non-metal solid material, which cushions the impact on the housing of the tie down during the use and transportation. Hence, the inner parts of the tie down are well protected, and its service life and working stability are improved. Under the action of the fasteners, both of the inner steel plate and outer steel plate tend to press the right half housing, so as to keep it positioned firmly under the press. Being impacted, the right half housing will stably produce elastic deformation to absorb the impact energy, which better protects the parts inside the tie down, and further improve the service life and working stability.

In the chain load binder, there are several through installation holes on the outer face of the right half housing. A bushing is installed inside each installation hole. On the outer steel plate, at the positions corresponding to the installation holes, there are round and embedding parts. The embedding parts insert into the installation holes and the end of the fasteners are screwed into the threads of the embedding parts.

The bushing installed in the installation hole increases the firmness of the connection between the fastener and the right half housing, meanwhile, it also supports the right half housing and makes the right half housing more stably produce elastic deformation to absorb the impact energy, which better protects the parts inside the tie down, and further improve the service life and working stability. The embedding parts inserted into the installation hole, which increases the contact area between the steel plate and the right half housing, and makes the connection between the right and left half housings more stable.

In addition to the above configurations, the following plan can also be used. There are several through installation holes on the outer face of the right half housing. On the outer steel plate, there are through holes at positions corresponding to the installation holes (1$b$1). The fasteners pass through the through holes on the left half housing (1$a$), through the holes on the inner steel plate, the installation holes on the right half housing, the through holes on the outer steel plate, and out of the end of the outer steel plate to get fixed. The fasteners could be either bolts with nuts at the ends for securing, or rivets.

In the chain load binder, the right half housing comprises a non-metal block I and a non-metal block II, of plate shape and installed parallel to the left half housing. The non-metal block I and non-metal block II are opposite to each other. The inner steel plate attaches to the non-metal block II, and the outer steel plate attaches to the non-metal block I. The bushing passes through the non-metal block I and into the non-metal block II. The sprocket is located between the non-metal block I and II.

The sprocket is fully enclosed between the non-metal block I and II. Every facet of the sprocket will be protected, the service life of the sprocket is improved, and hence the service life and working stability of the tie down are improved.

In the chain load binder, on the side of the non-metal block I opposite to the non-metal block II, there is a recessed location cavity I. On the corresponding side of the non-metal block II, there is a recessed location cavity II. The sprocket is located between the location cavity I and II, and both ends of the chain stretch downward, out of the connecting part between the non-metal block I and II.

Namely, the connecting part between the chain and the sprocket is fully located between the non-metal block I and II, which well protects both of the sprocket and the chain, and hence improve the service life and working stability of the tie down.

In the chain load binder, a link rod is installed on the top of the right half housing. The inner end of the link rod is clamped between the non-metal block I and II. The outer end of the link rod is connected to a hook. The inner end is fixed to the right half housing with a screw installed through the outer steel plate.

The inner end of the link rod presses against the non-metal block I and II respectively. When the hook impacts on other things, the non-metal block I and II will produce elastic deformation to absorb the impact energy, so as to protect the link rod, and hence improve the service life and the working stability of the tie down.

In the chain load binder, the bushing is made of metal material.

The bushing is made of metal material, which increases the firmness of the fastener connection, effectively improves the stability of the right half housing's positioning, and allows the right half housing able to absorb the impact energy more steadily. Therefore, the tie down is effectively protected and the service life and the working stability are improved.

The connection feature of the hook could also be: the right half housing is connected to the hook through a universal joint. There are recesses on the top of the non-metal block I and II. The inner steel plate and outer steel plate are located on both sides on the recesses and form an installation cavity. The lower end of the universal joint is located in the installation cavity and hinged with the inner steel plate and the outer steel plate. This design reduces the volume of the housing and achieves a compact structure. Also, a sufficient rigidness is guaranteed to bear the force, by the connection between the left half housing and the inner steel plate and outer steel plate, with fasteners.

For an easy connection, the left half housing can be split into several parts. Such a left half housing comprises an installation rack and an outer cover. The upper part of the installation rack is rectangular, and the lower part has bosses protruding above the upper part and the fasteners are located at the bosses. This configuration can further reduce the volume and achieve a compact structure.

In the chain load binder, a force sensor is installed on the end of the worm, which doesn't stretch out of the housing. A display screen is set on the side of the right half housing, which is connected to the force sensor, and is able to display the numerical values detected by the force sensor. The display screen is firmly clamped between the non-metal block I and II.

During the rotation of the worm, it presses against the force sensor. When the sensor is subject to the press, it detects the tension in the tie down, and the display screen will display the numerical values detected by the sensor. The display screen is firmly clamped between the non-metal block I and II. This cushions and protects the display screen, and effectively improves the service life of both of the display screen and the tie down.

In the chain load binder, the display screen is rectangular. The non-metal block I has a gap I on its side, and the non-metal block II has a gap II on its side. The display screen is located between gap I and II, and the shape enclosed by the gaps I and II fits the shape of the display screen.

The structure stated above increases the contact area between the display screen and the right half housing, further improve the cushioning and protection effect, and effectively improve the service life of the display screen and the tie down.

Compared to the prior art, the present chain load binder has the following advantages:

1. The right half housing is made of non-metal solid material, which cushions the impact on the housing of the tie down during the use and transportation. Hence, the inner parts of the tie down are well protected, and its service life and working stability are improved.

2. Under the action of the fasteners, both of the inner steel plate and outer steel plate tend to press the right half housing, so as to keep the right half housing positioned firmly under the press. Being impacted, the right half housing will stably produce elastic deformation to absorb the impact energy, which better protects the parts inside the tie down, and further improve the service life and working stability.

3. The bushing installed in the installation hole increases the firmness of the connection between the fastener and the right half housing, meanwhile, the bushing also supports the right half housing and makes the right half housing more stably produce elastic deformation to absorb the impact energy, which better protects the parts inside the tie down, and further improve the service life and working stability.

DETAILED DESCRIPTION OF THE INVENTION

Figure 1:
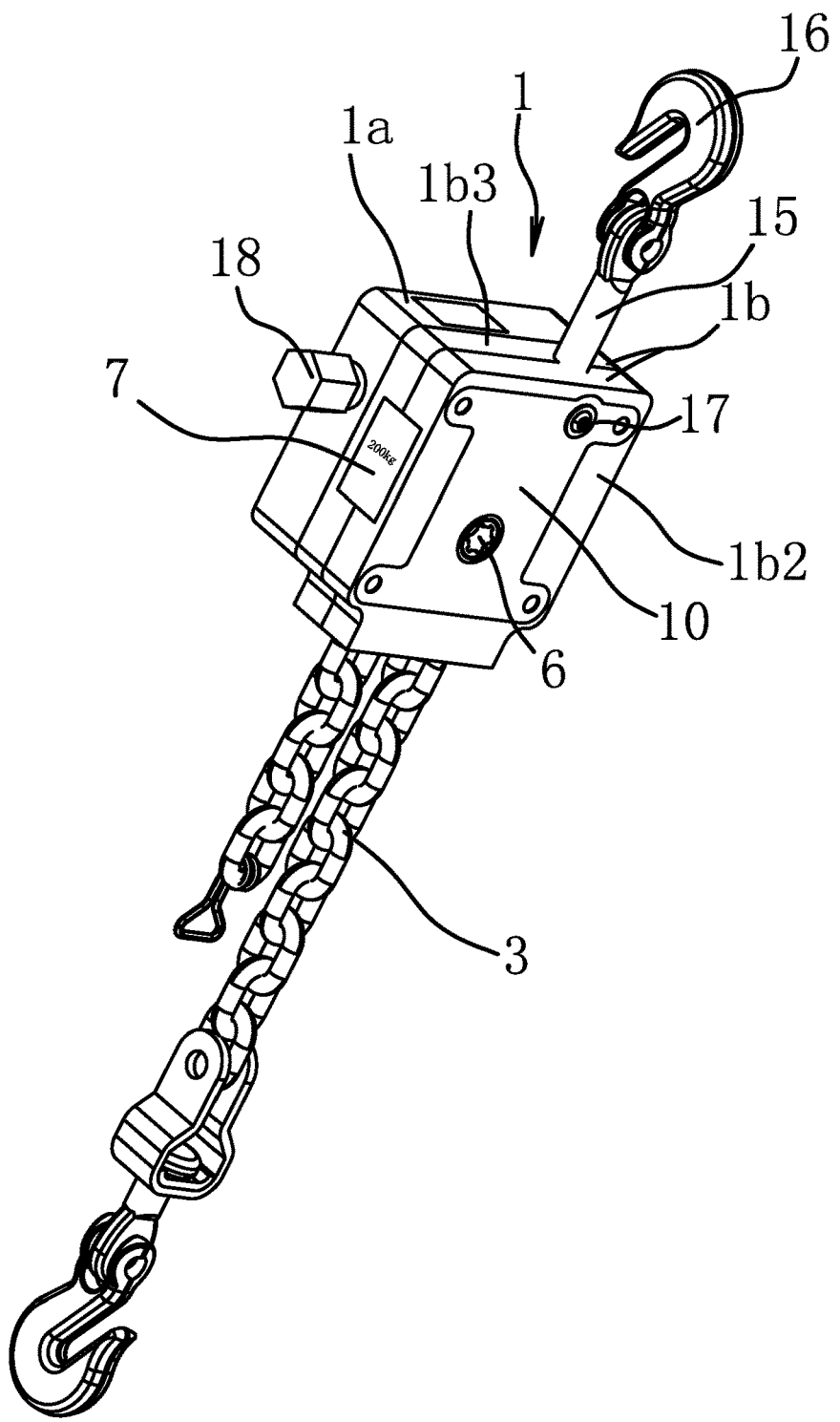
FIG. 1 is the perspective schematic view of a first embodiment of the present chain load binder.

The preferred embodiments of this invention will be described below and the technical solutions of the invention will be further illustrated in connection with the accompanying figures. However, the present invention shall not be limited to these embodiments.

Embodiment I

As shown in FIG. 1 through FIG. 8, one preferred embodiment of the present chain load binder comprises a housing (1), a sprocket (2), a chain (3), a worm (4), a worm gear (5), a spline shaft (6) and a display screen.

Figure 2:
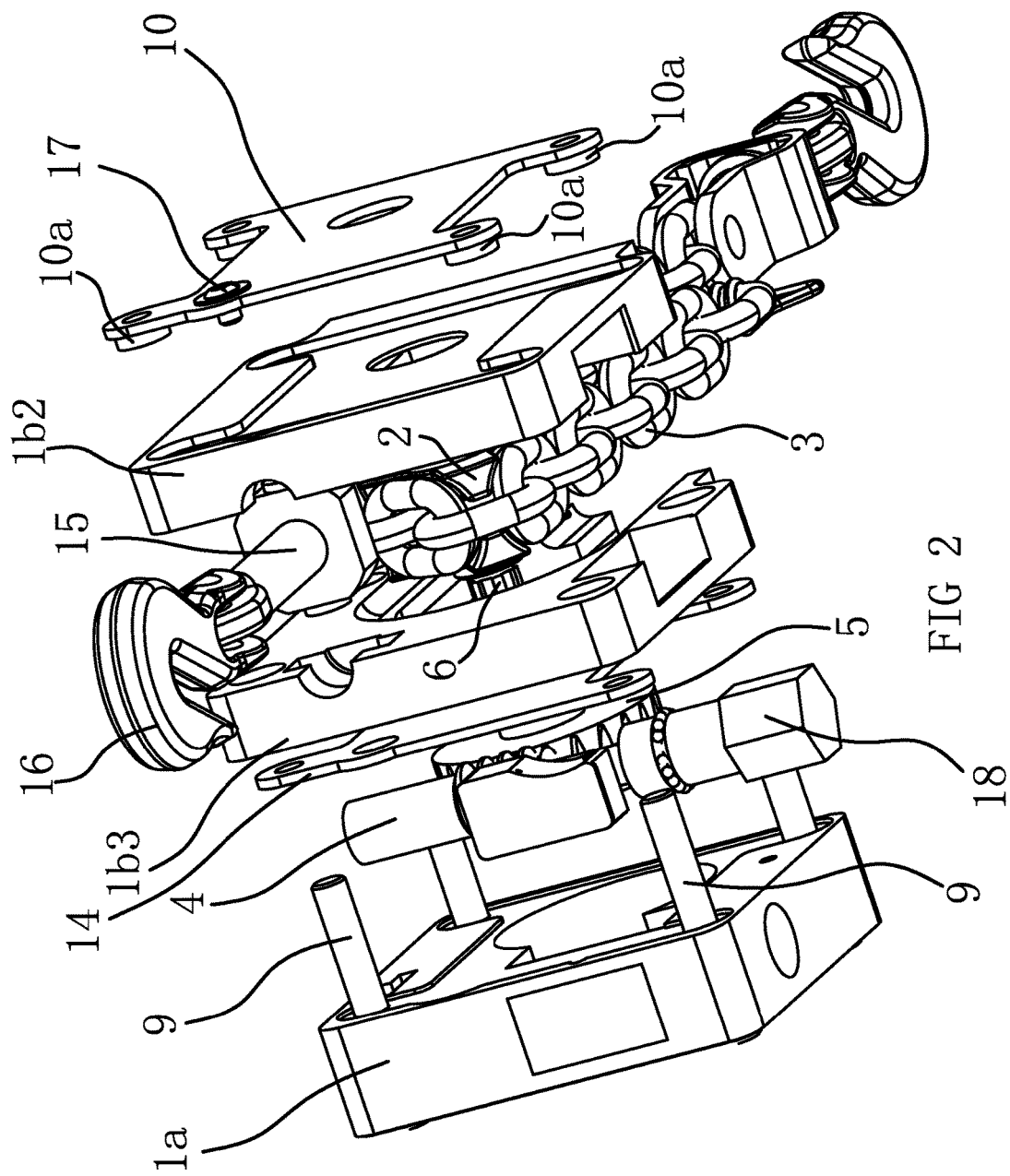
FIG. 2 is the exploded schematic view of a first embodiment of the present chain load binder with the display screen removed.
Figure 3:
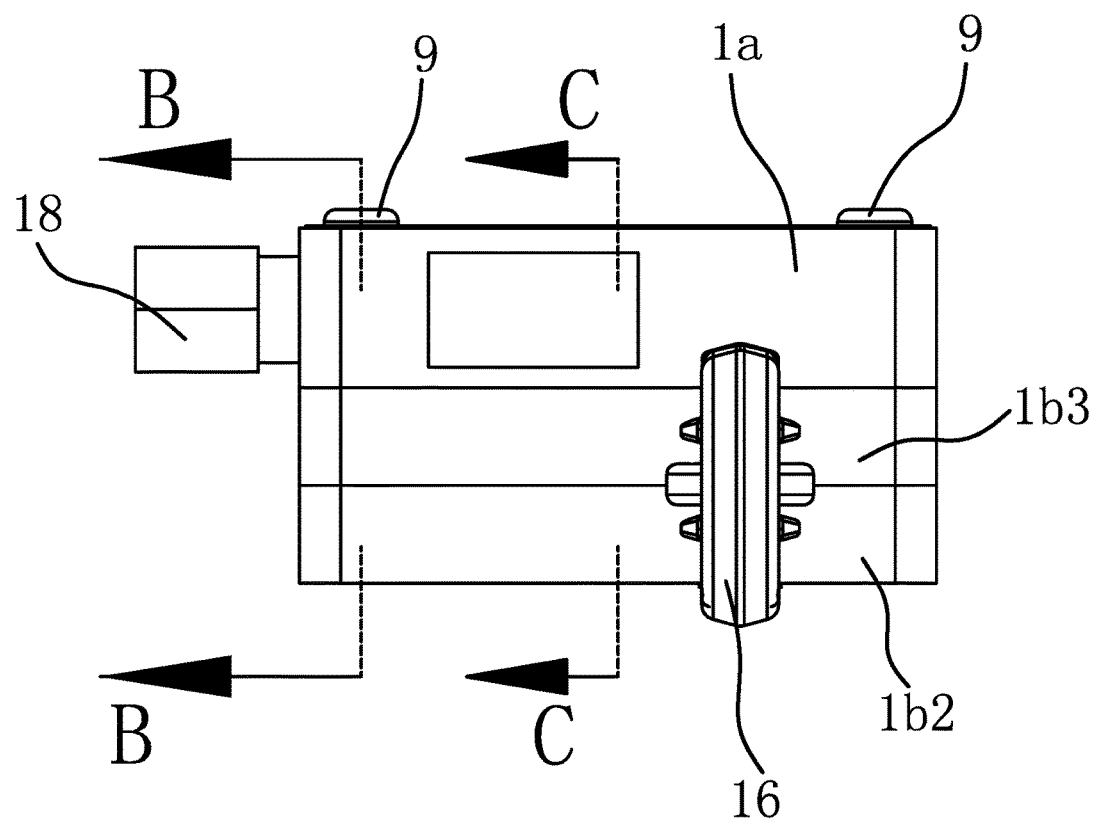
FIG. 3 is the bottom schematic view of a first embodiment of the present chain load binder.
Figure 4:
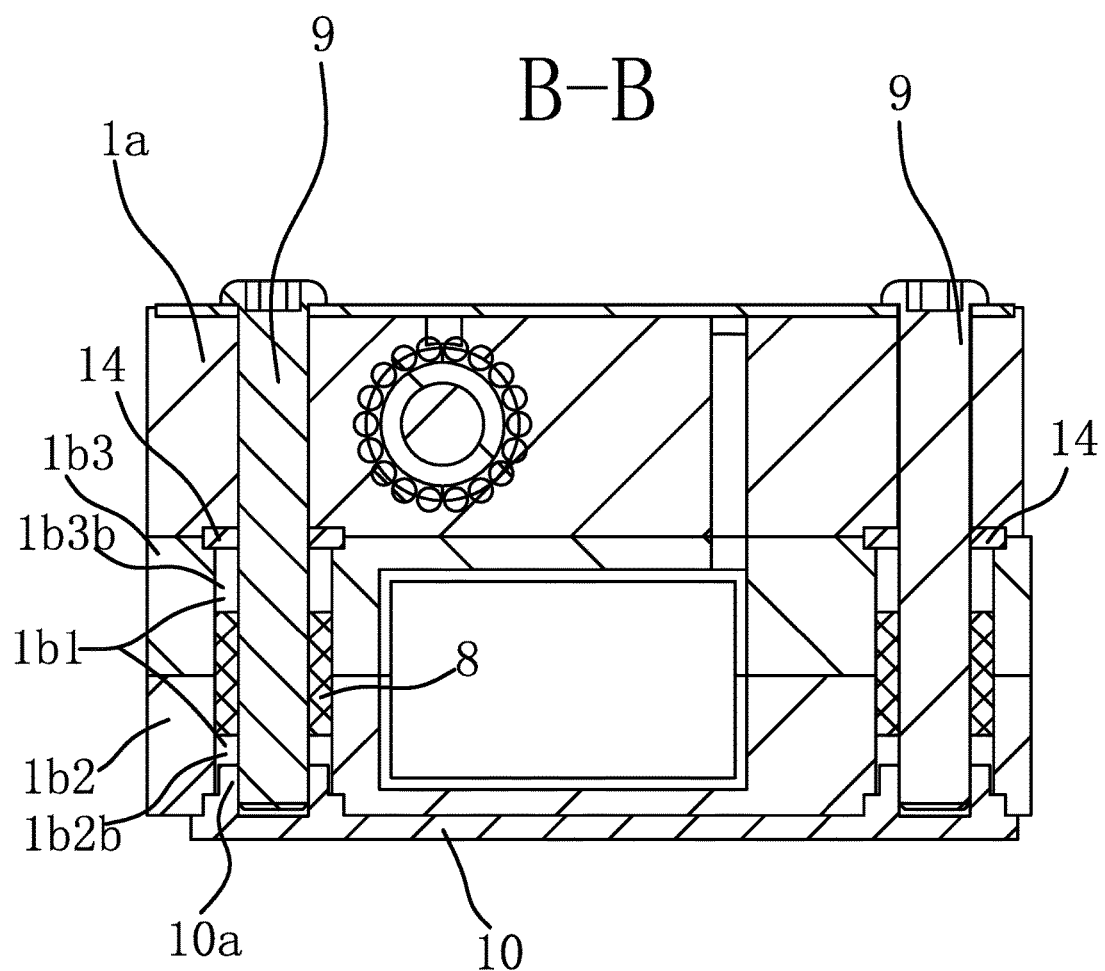
FIG. 4 is B-B section view of FIG. 3.

As shown in FIG. 1 and FIG. 2, the housing (1) has a cavity inside and the housing (1) consists of the left half housing (1a) and the right half housing (1b) connecting to each other. In this embodiment, the left half housing (1a) is made of hard metal material such as iron or copper, and the right half housing (1b) is made of non-metal material. The non-metal material may be elastic material such as rubber and plastic. Rubber is used in this embodiment.

As shown in FIG. 2 through FIG. 7. The inner steel plate (14) and the outer steel plate are installed on the inner and outer sides of the right half housing (1b) respectively. The inner steel plate (14) and the outer steel plate (10) attach to the inner and outer sides of the right half housing (1b) respectively. The left half housing (1a) and the outer steel plate (10) are secured with fasteners (9) passing through the left half housing (1a), the inner steel plate (14), the right half housing (1b) and the outer steel plate (10) successively. The fasteners (9) may be screws, bolts and other mechanical fasteners.

It could be further optimized. There are several installation holes (1b1) on the right half housing (1b), and a cylindrical bushing (8) is fixed inside each installation hole (1b1). On the outer steel plate (10), at the positions corresponding to the installation holes (1b1), there are round and protruding embedding parts (10a). Each embedding part (10a) inserts into the corresponding installation holes (1b1). The number of fasteners (9) is the same as that of the installation holes (1b1) and the positions are aligned. The end of the each fastener (9) passes through the corresponding installation hole (1b1) and is screwed into the threads of the corresponding embedding part (10b). This makes both of the inner steel plate (14) and outer steel plate (10) tend to press the right half housing (1b), so as to keep the right half housing (1b) positioned firmly under the press from the inner steel plate (14) and the outer steel plate (10). Being impacted, the right half housing (1b) will stably produce elastic deformation to absorb the impact energy, which better protects the parts inside the tie down, and further improve the service life and working stability.

Specifically, as shown in FIG. 1 through FIG. 9, the right half housing (1b) comprises a non-metal block I (1b2) and a non-metal block II (1b3), of plate shape and installed parallel to the left half housing (1a). The non-metal block I (1b2) and non-metal block II (1b3) are opposite to each other. Here, the non-metal block II (1b3) presses against the left half housing (1a). The inner steel plate (14) stands against the non-metal block II (1b3), and the outer steel plate (10) stands against the non-metal block I (1b2). There are through installation holes I (1b2b) all around the non-metal block I (1b2), and there are installation holes II (1b3b) on the non-metal block II (1b3). The number of the installation holes II (1b3b) is the same as that of the installation holes I (1b2b) and both installations are aligned. The adjacent installation hole I (1b2b) and installation hole II (1b3b) form the installation hole (1b1) above. The two ends of the bushing (8) are located in the installation hole I (1b2b) and the installation hole II (1b3b) respectively, and both of the non-metal block I (1b2) and the non-metal block II (1b3) are fixed to the bushing (8).

Here are further explanations: the bushing (8) is made of hard metal such as iron and copper. This increases the firmness of the connection between the fastener (9) and the bushing (8), effectively enhanced the positioning stability of the right half housing (1b), and allows the right half housing able to absorb the impact energy more steadily. Therefore, the tie down is effectively protected and the service life and the working stability are improved.

Figure 8:
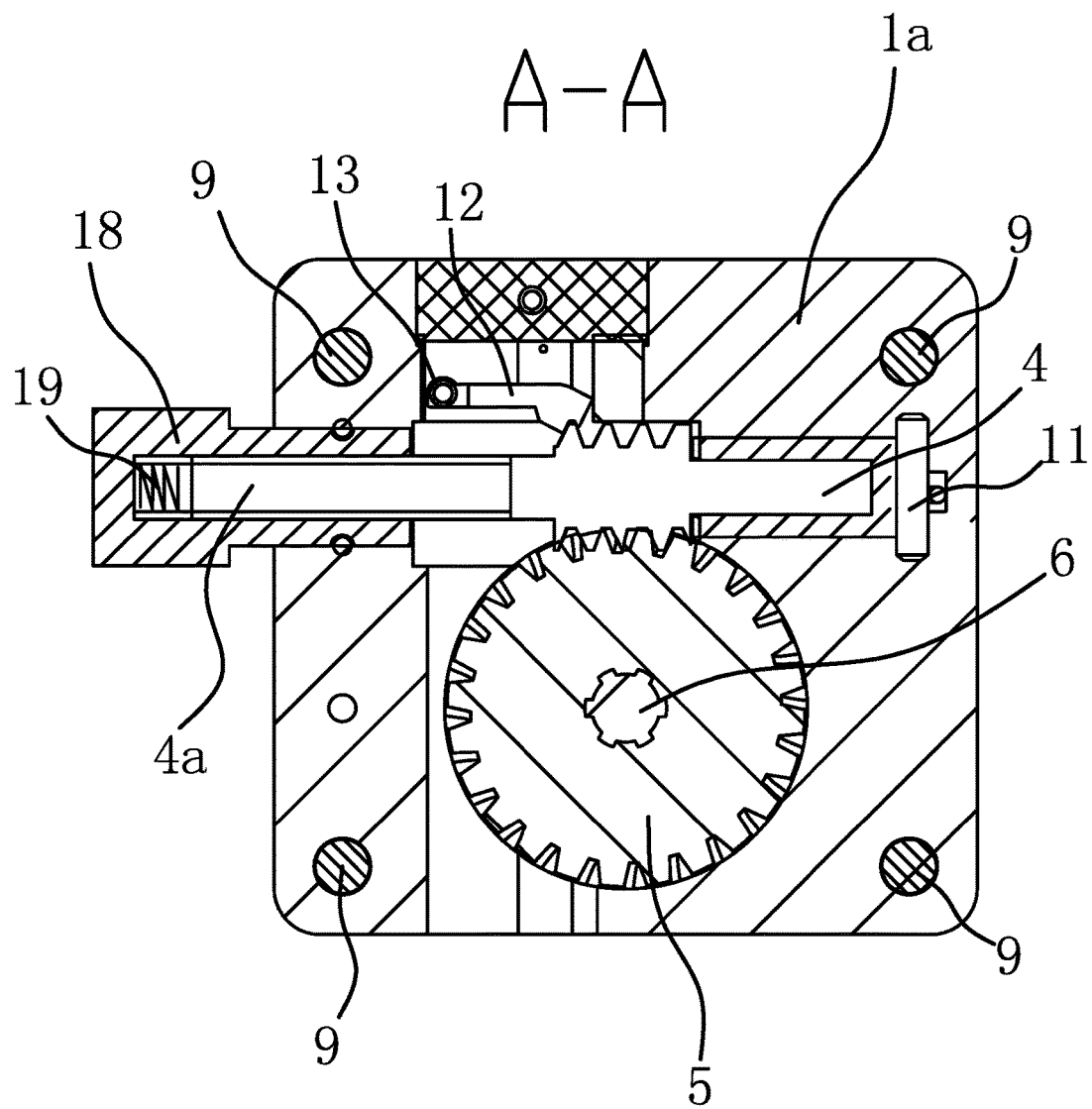
FIG. 8 is A-A section view of FIG. 6.
Figure 9:
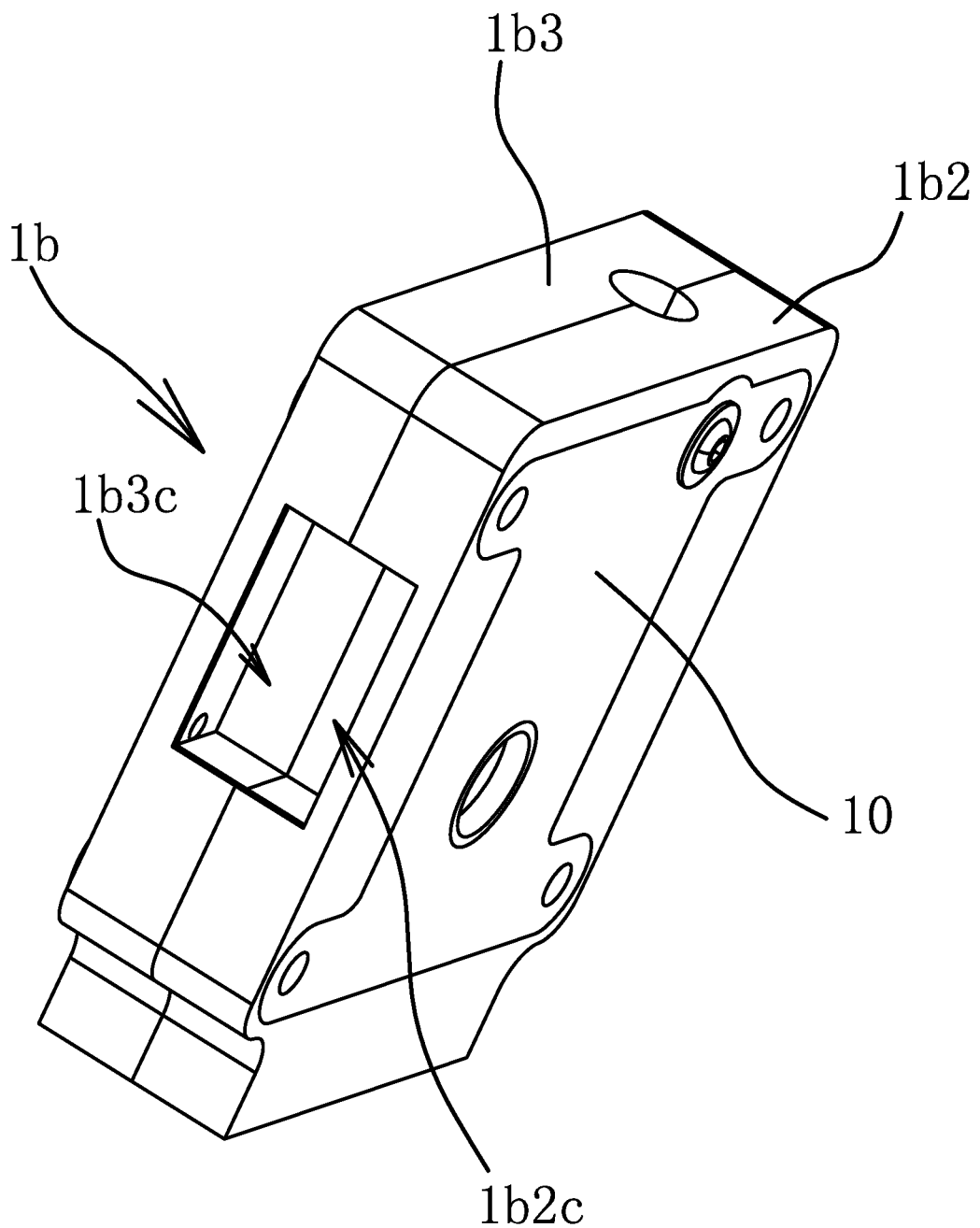
FIG. 9 is the perspective schematic view of the right half housing in a first embodiment of the present chain load binder.

As shown in FIG. 8, both of the worm (4) and worm gear (5) stated above are fixed inside the left half housing (1a). Here, the worm (4) is installed horizontally in the left half housing (1a). The worm gear (5) is just below the worm (4) and mesh with the worm (4). One end of the worm (4) stretches out of the left half housing (1a) and that end has a rotating part (4a) able to connect to a tool. Further explanation; the rotating part (4a) has an external spline, and the rotating part (4a) connects to the rotation sleeve (18) through the spline. There is a reset spring (19) between the end of the rotating part (4a) and the rotation sleeve (18). The rotation sleeve (18) is axially fixed to the left half housing (1a). A force sensor (11) is set on the side wall of the housing (1), opposite to the other end of the worm (4). The force sensor (11) is opposite to the worm (4).

As shown in FIG. 8, there is a guiding part (12) inside the left half housing (1a), and the guiding part (12) is just above the worm (4). Specifically, one end of the guiding part (12) is hinged with the left half housing (1a). There is a spring (13) set between one end of the guiding part (12) and the left half housing (1a). Under the elastic force of the spring (13), the other end of the guiding part (12) tends to insert into the teeth of the worm (4). In this embodiment, on the other end of the guiding part (12), there are teeth which can mesh with the teeth on the worm (4). When in actual use, rotating the rotating part (4a) drives the worm (4) to rotate. Since the worm (4) meshes with the guiding part (12) and the guiding part (12) can't move, the worm (4) moves forward along the guiding part (12), until the worm (4) meshes with the worm gear (5) and transmits the power. At that moment, the end of the worm (4) engages with the force sensor (11). The force sensor (11) is pressed and thus detects the tension in the chain (3).

Figure 5:
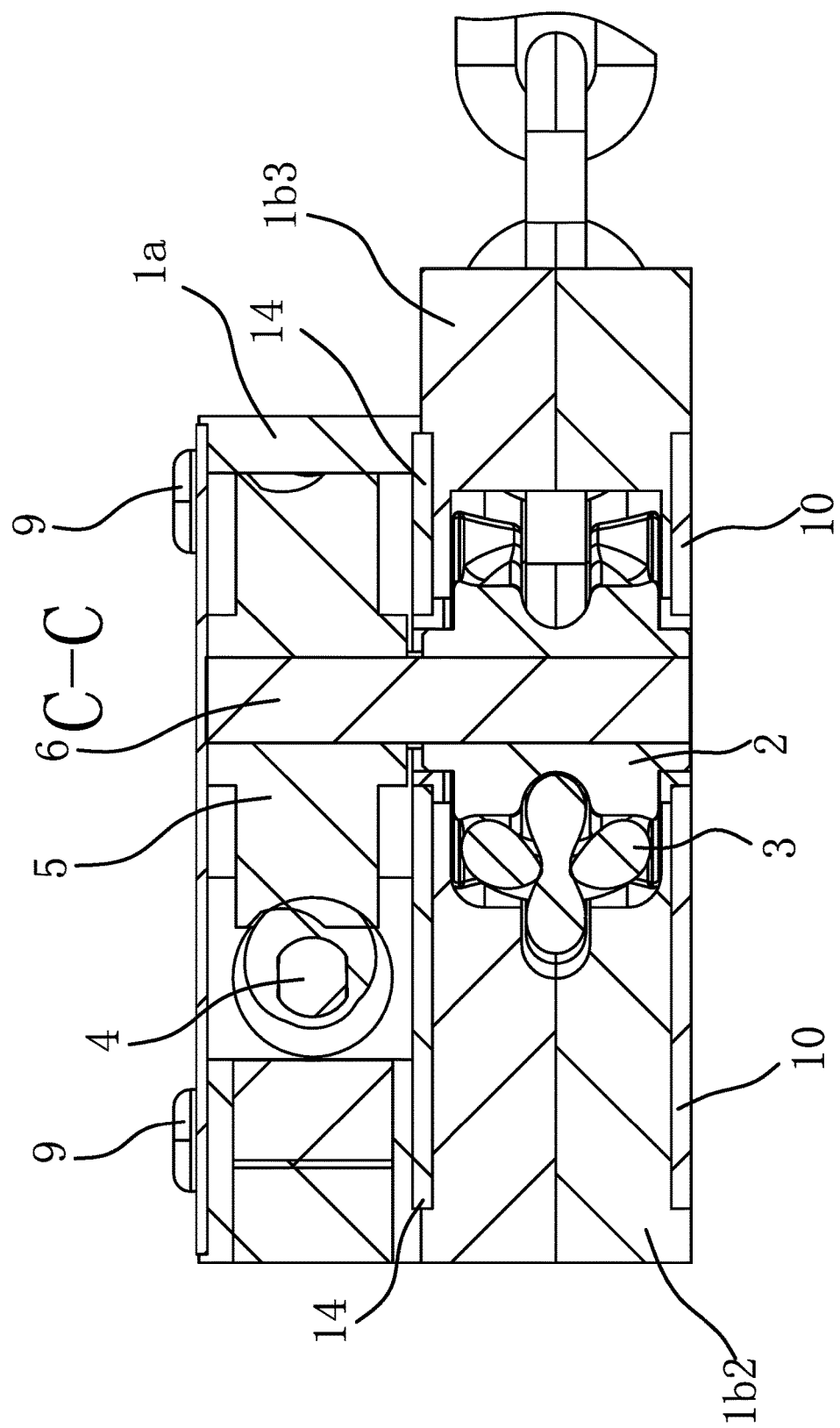
FIG. 5 is C-C section view of FIG. 3.
Figure 6:
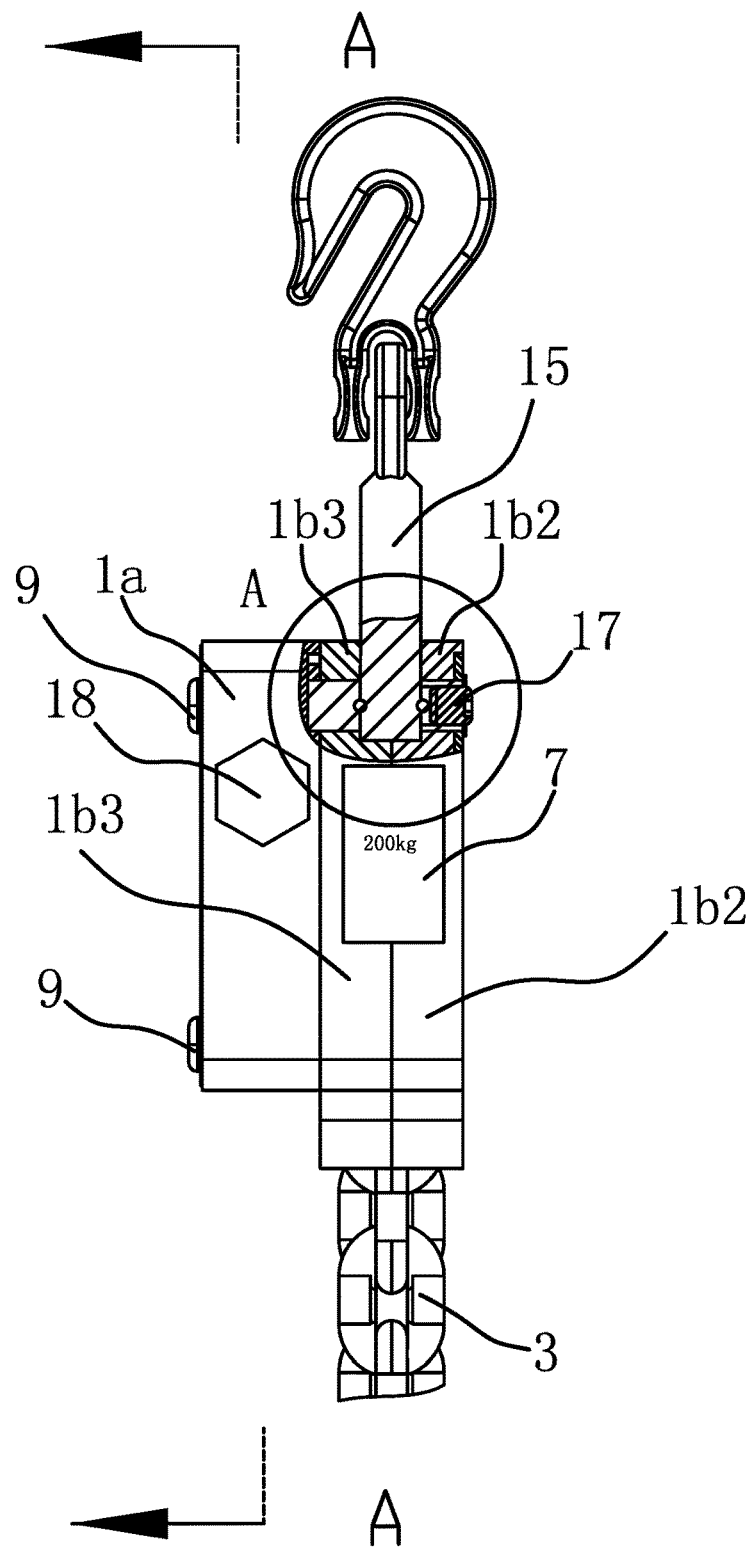
FIG. 6 is the left schematic view of a first embodiment of the present chain load binder.
Figure 7:
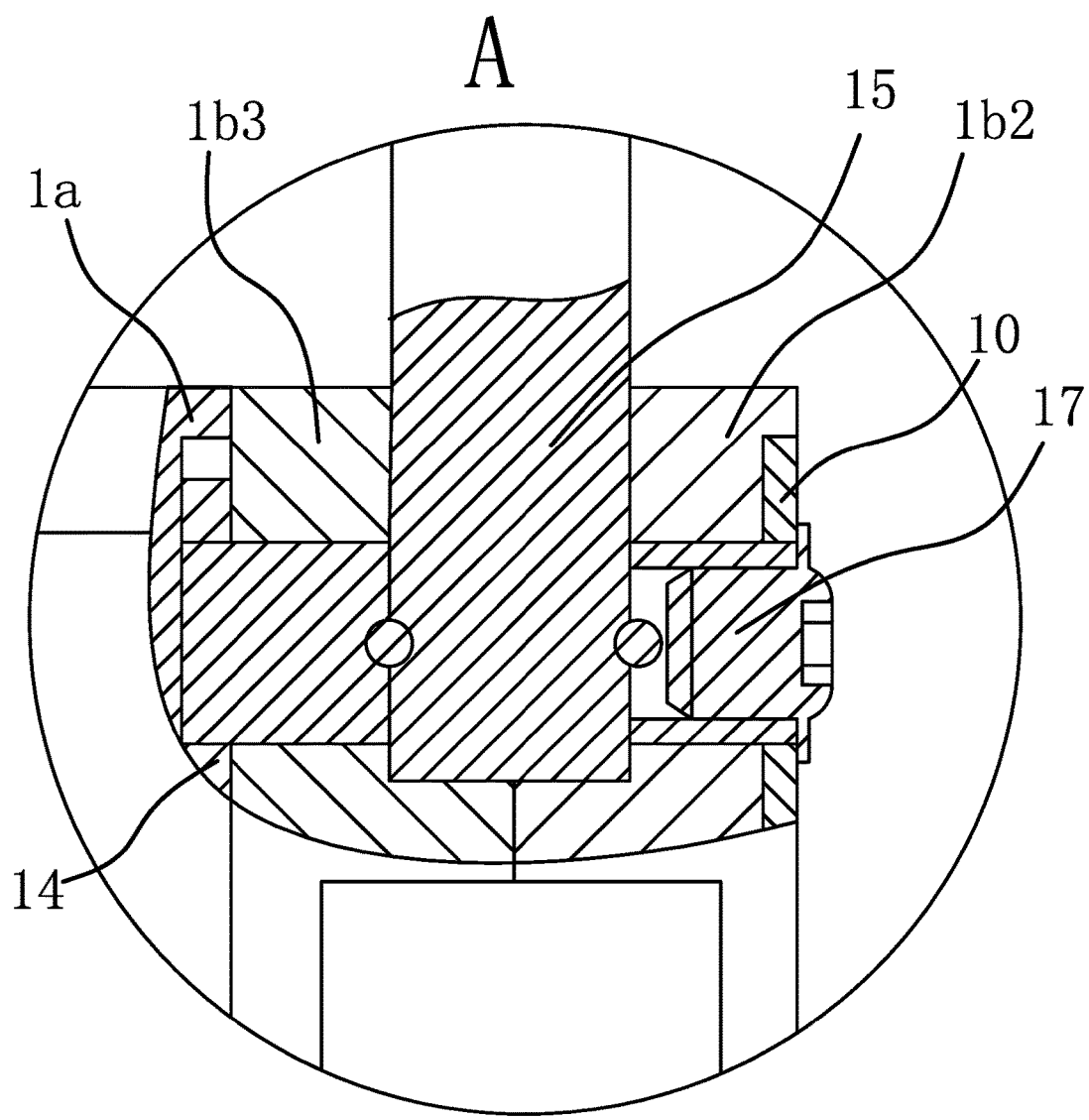
FIG. 7 is the perspective schematic view of the connection between the link rod and the right half housing in a first embodiment of the present chain load binder.

As shown in FIG. 2 and FIG. 5, the sprocket (2) is opposite the worm gear (5) and the sprocket (2) is located inside the right half housing (1b). The chain (3) winds around the sprocket (2) and both ends of the chain (3) stretch out of the bottom of the right half housing (1b). The spline shaft (6) inserts into the right half housing (1b) from the left half housing (1a), and two ends of the spline shaft (6) connect to the worm gear (5) and the sprocket (2) respectively, in order to allow the worm gear (5) to drive the sprocket (2) to rotate, so as to tighten or loosen the chain (3).

Figure 10:
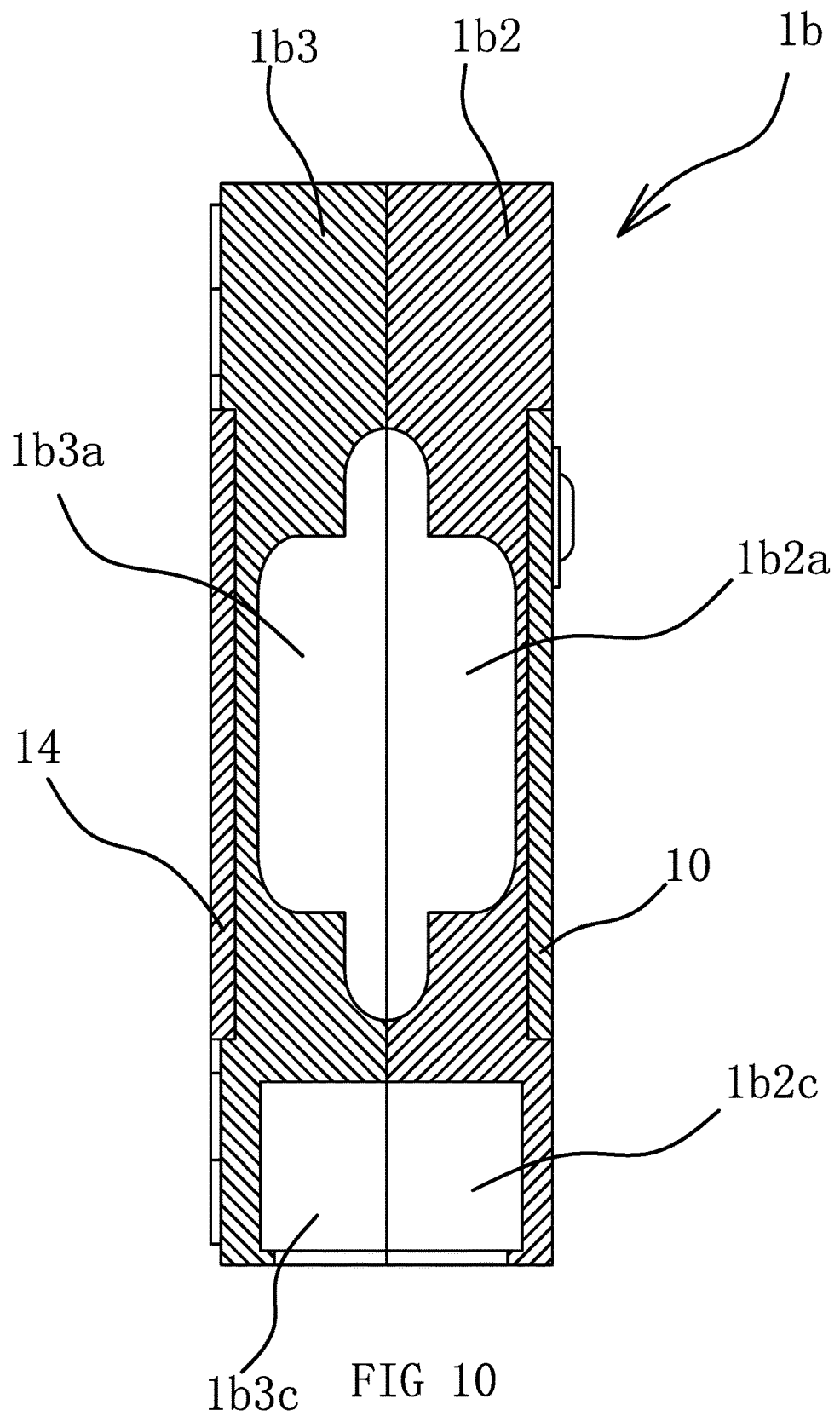
FIG. 10 is the sectional perspective schematic view of the right half housing in a first embodiment of the present chain load binder.

In this embodiment, as shown in FIG. 5 and FIG. 10, The sprocket (2) is located between the non-metal block I (1b2)

and the non-metal block II (1b3). On the side of the non-metal block I (1b2) opposite to the non-metal block II (1b3), there is a recessed location cavity I (1b2a). On the corresponding side of the non-metal block II (1b3), there is a recessed location cavity II (1b3a). The sprocket (2) is located between the location cavity I (1b2a) and the location cavity II (1b3a), and both ends of the chain (3) stretch downward, out of the connecting part between the non-metal block I (1b2) and the non-metal block II (1b3). Every facet of the sprocket (2) is protected, the service life of the chain (3) is improved, and hence the service life and working stability of the tie down are improved.

As shown in FIG. 1, FIG. 6, FIG. 9, and FIG. 10, the display screen (7) is fixed on one side of the right half housing (1b). The display screen (7) is connected to the force sensor (11) and can display the numerical values detected by the force sensor (11). Specifically, the display screen is (7) rectangular. The non-metal block I (1b2) has a gap I (1b2c) on its side, and the non-metal block II (1b3) has a gap II (1b3c) on its side. The display screen (7) is located between gap I (1b2c) and gap II (1b3c), and the shape enclosed by the gap I (1b2c) and gap II (1b3c) fits the shape of the display screen (7). This makes the display screen (7) firmly clamped between the non-metal block I (1b2) and non-metal block II (1b3). This cushions and protects the display screen (7), and effectively improves the service life of both of the display screen (7) and the tie down.

As shown in FIG. 1, FIG. 2, FIG. 6, and FIG. 7, a link rod (15) is installed on the top of the right half housing (1b). The inner end of the link rod (15) is clamped between the non-metal block I (1b2) and the non-metal block II (1b3). The outer end of the link rod (15) is connected to a hook (16). The inner end of the link rod (15) is fixed to the right half housing (1b) with a screw (17) installed through the outer steel plate (10). The inner end of the link rod (15) presses against the non-metal block I (1b2) and the non-metal block II (1b3) respectively. When the hook (16) impacts on other things, the non-metal block I (1b2) and the non-metal block II (1b3) will produce elastic deformation to absorb the impact energy, so as to protect the link rod (15), and hence improve the service life and the working stability of the tie down.

Embodiment II

Figure 11:
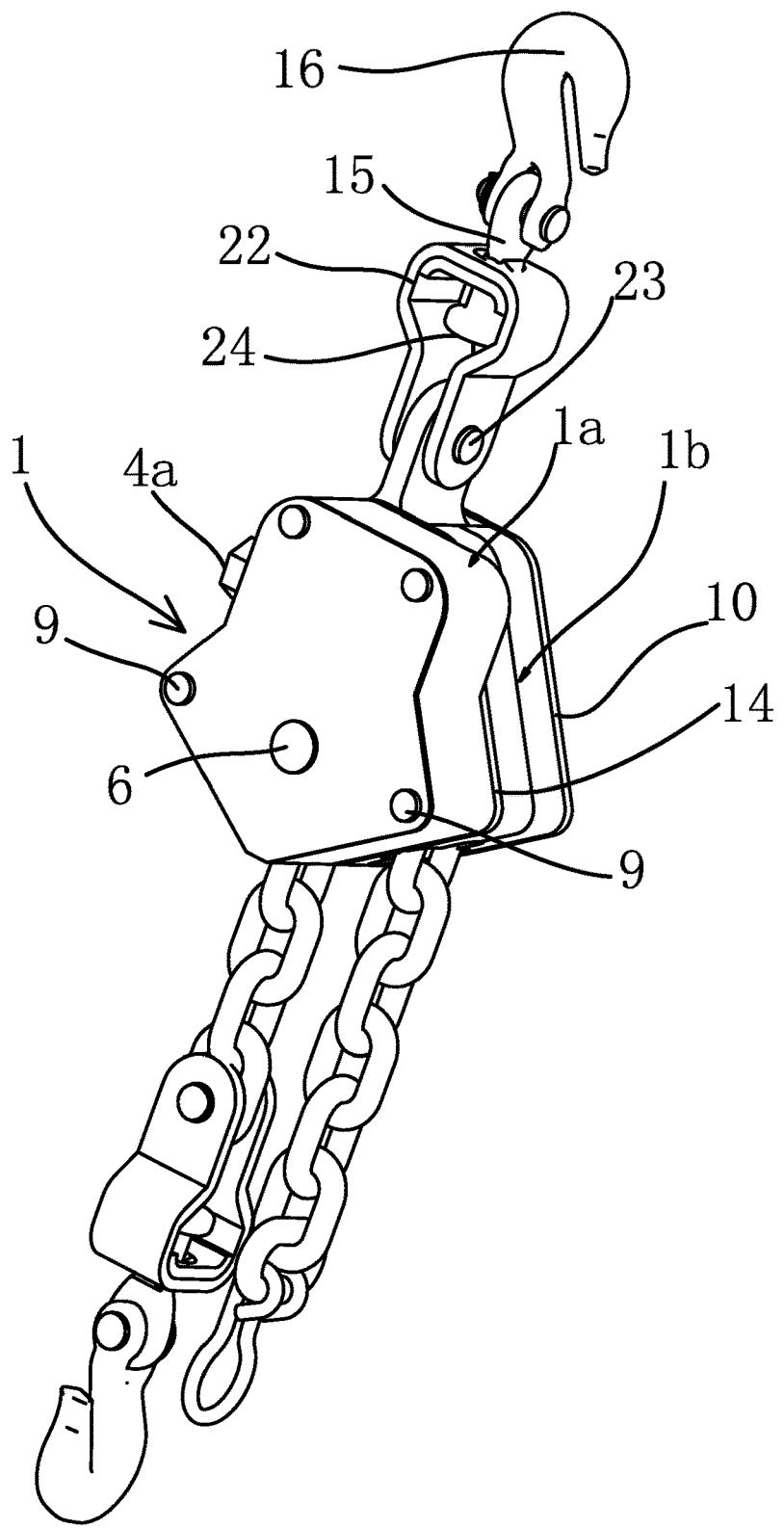
FIG. 11 is the perspective schematic view of a second embodiment of the chain load binder.

As shown in FIG. 11, the structure of the chain load binder in embodiment II is basically the same as that in embodiment I. The differences are: first, the shape of the housing (1) is changed and the display screen (7) is left out; second, the connection pattern of the left half housing (1a), the inner steel plate (14), the right half housing (1b) and the outer steel plate (10) is changed; third, the connection pattern between the hook (16) and the housing (1) is changed.

Figure 12:
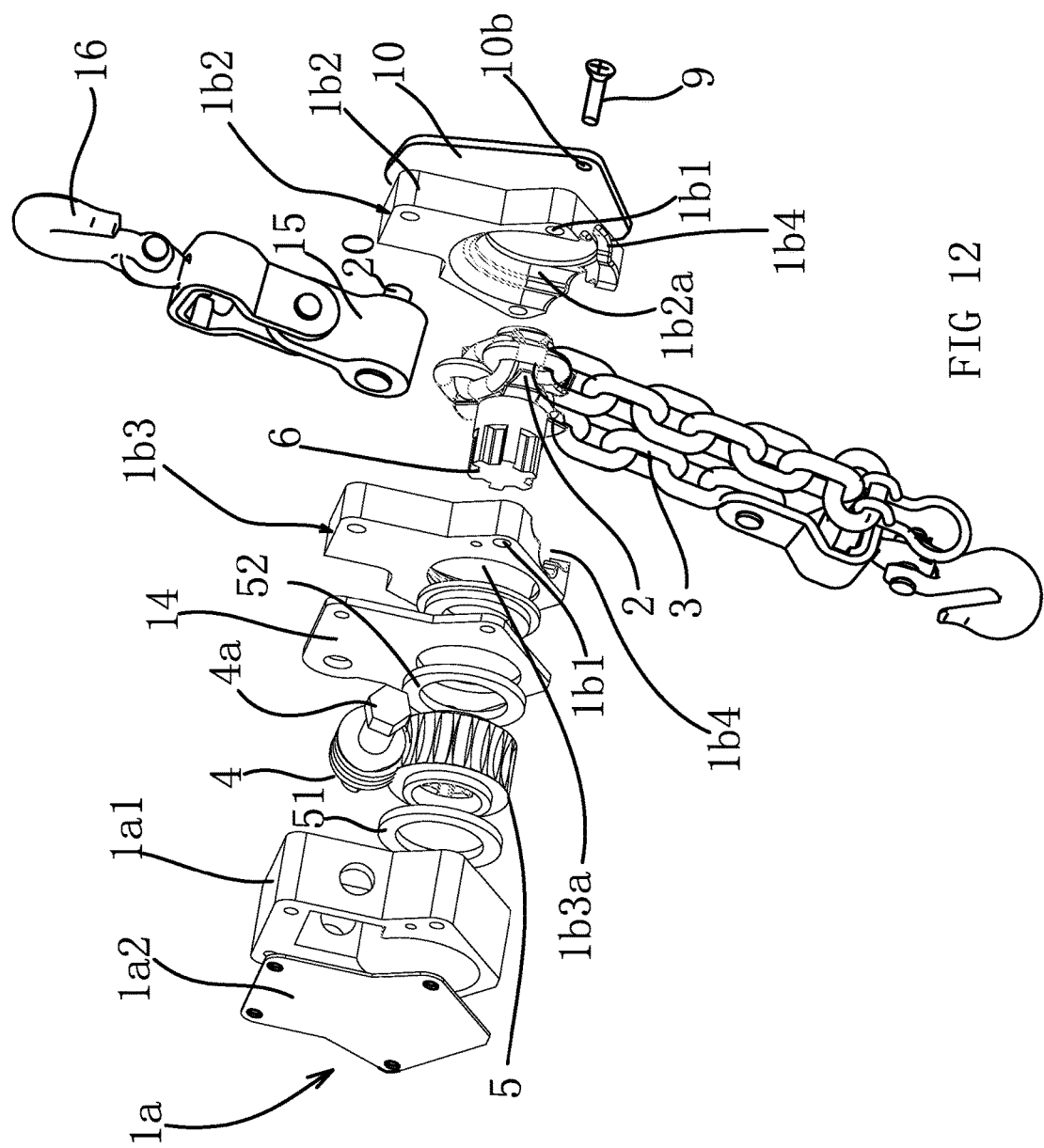
FIG. 12 is the exploded view of a second embodiment of the present chain load binder.
Figure 13:
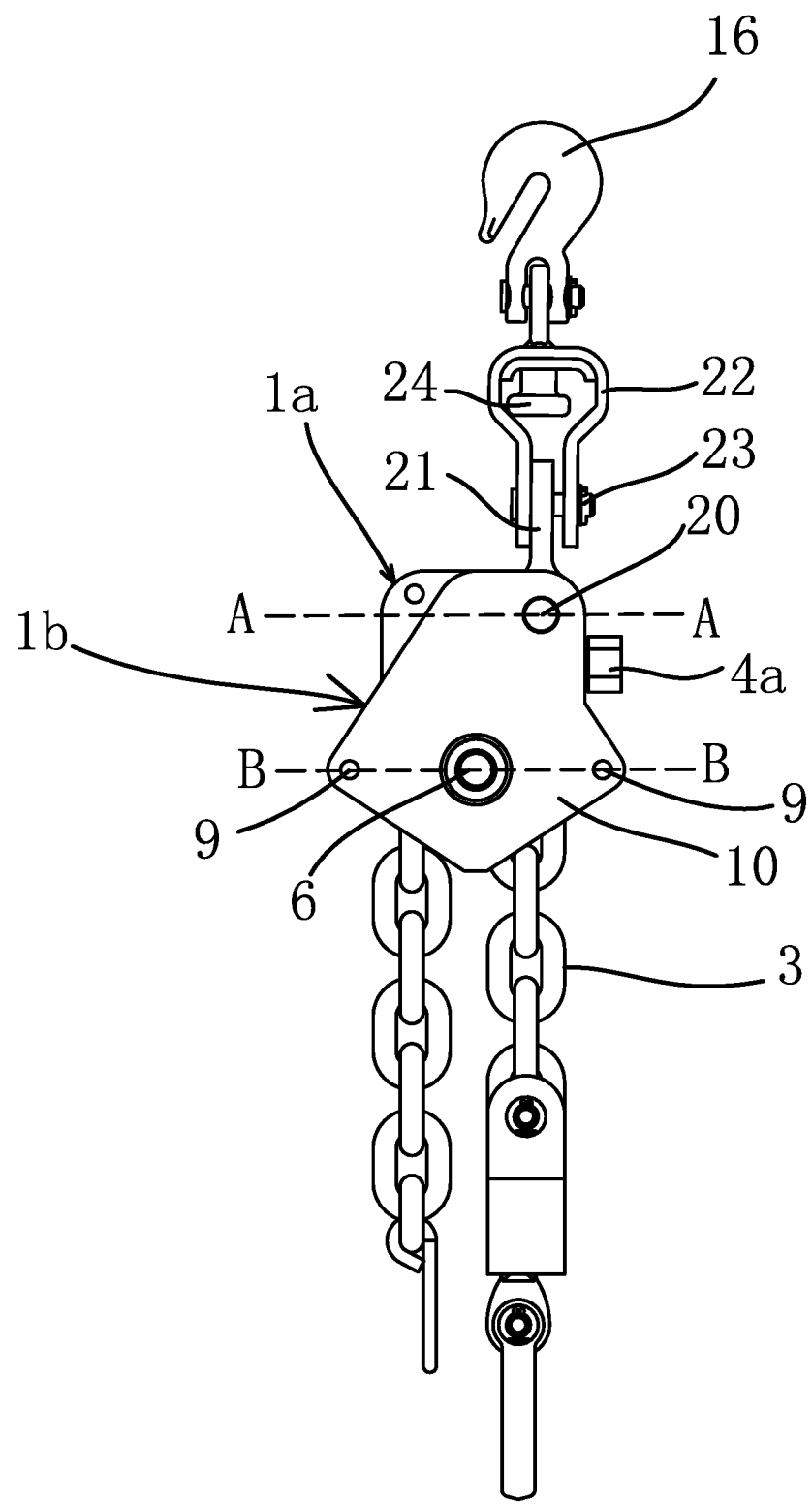
FIG. 13 is the left view of FIG. 11.
Figure 14:
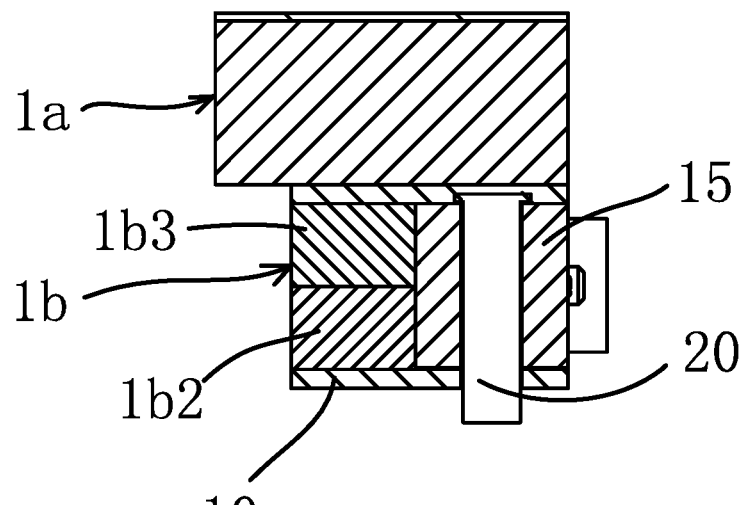
FIG. 14 is the perspective schematic view of Section A-A in FIG. 13.
Figure 15:
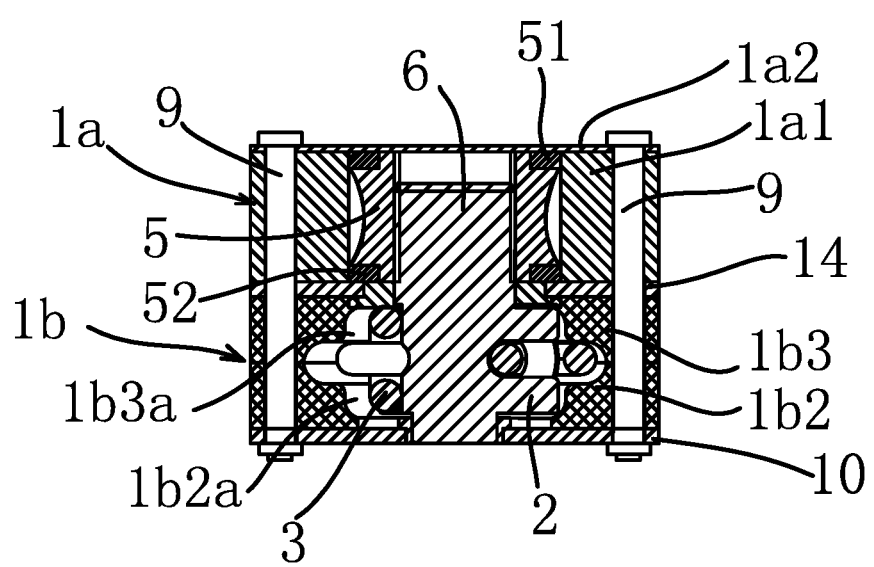
FIG. 15 is the perspective schematic view of Section B-B in FIG. 13.
Figure 16:
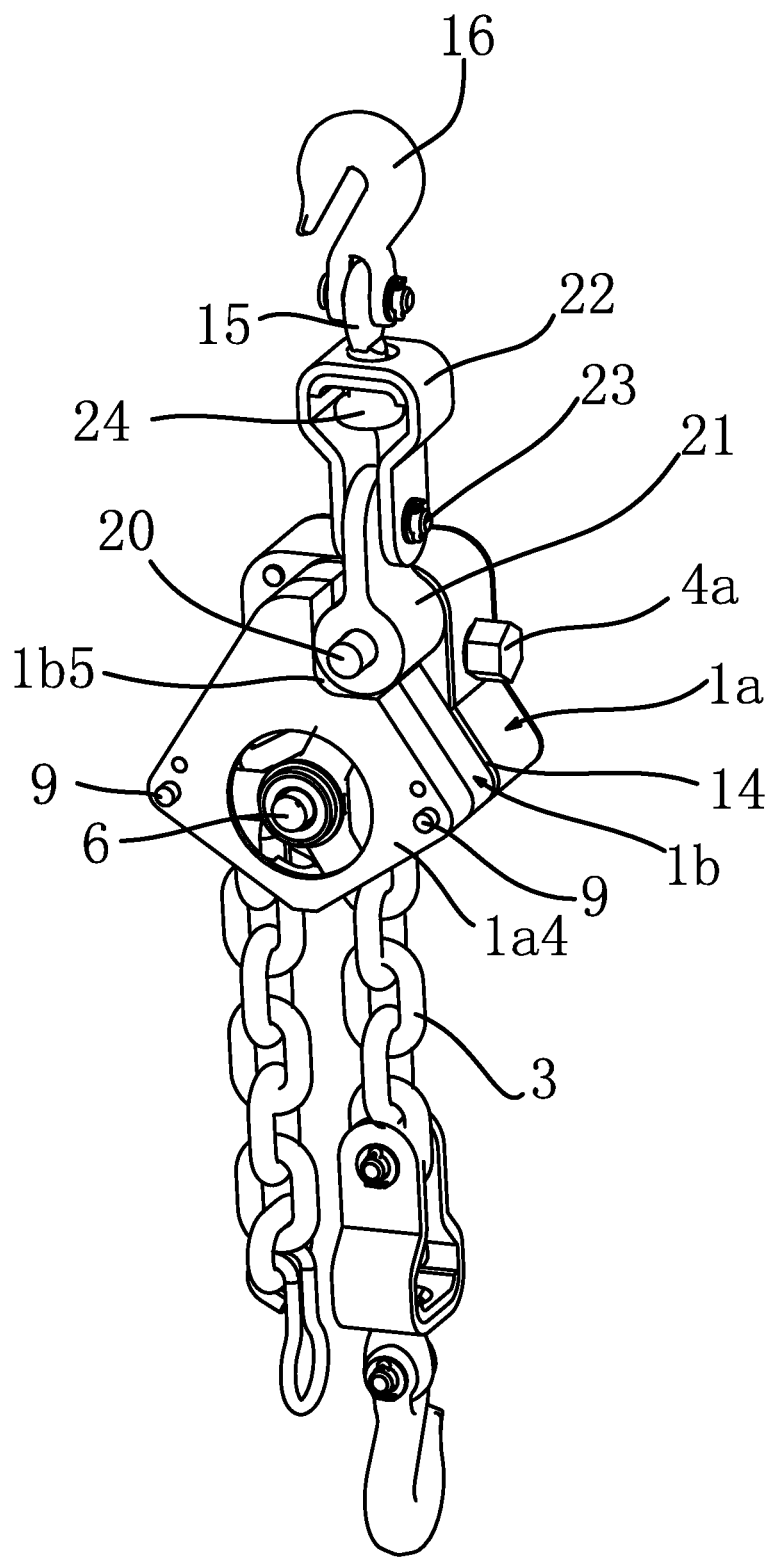
FIG. 16 is the perspective schematic view of FIG. 11 with the steel plate (10) removed.

Specifically, as shown in FIG. 12, FIG. 13, and FIG. 15, the right half housing (1b) comprises a non-metal block I (1b2) and a non-metal block II (1b3), of plate shape and installed parallel to the left half housing (1a). The non-metal block I (1b2) and non-metal block II (1b3) are opposite to each other. The inner steel plate (14) attaches to the non-metal block II (1b3), and the outer steel plate (10) attaches to the non-metal block I (1b2). The sprocket (2) is located between the non-metal block I (1b2) and the non-metal block II (1b3). There are several through installation holes (1b1) on the outer face of the right half housing (1b). That is, on the non-metal block I (1b2) and the non-metal block II (1b3), there are installation holes (1b1) and there are through holes on the inner steel plate (14). On the outer steel plate (10), there are through holes (10b) at positions corresponding to the installation holes (1b1). The left half housing (1a) comprises the installation rack (1a1) and the outer cover (1a2). There are through holes on the installation rack (1a1) and the outer cover (1a2) as well. The fastener (9) passes through the through hole (10b) on the outer steel plate (10), the installation hole (1b1) on the non-metal block I (1b2) and the non-metal block II (1b3), the through hole on the inner steel plate (14), and the through hole on the left half housing (1a), and connects the outer steel plate (10), the non-metal block I (1b2), the non-metal block II (1b3), the inner steel plate (14), the installation rack (1a1) and the outer cover (1a2) to form a whole body. The housing (1) is directly secured with fasteners. Under the action of the fasteners, both of the inner steel plate and outer steel plate tend to press the right half housing (1b), so as to keep the right half housing (1b) positioned firmly under the press from the inner steel plate (14) and outer steel plate (10). Being impacted, the right half housing (1b) will stably produce elastic deformation to absorb the impact energy, which better protects the parts inside the tie down. The upper part of the installation rack (1a1) is rectangular, and the lower part of the installation rack (1a1) has bosses (1a4) protruding from the upper part and the fasteners are located at the bosses (1a4). There are corresponding bosses on the non-metal block I (1b2), non-metal block II (1b3), inner steel plate (14) and outer steel plate (10), for fastening.

As shown in FIG. 12, FIG. 13, FIG. 14, and FIG. 16, on the side of the non-metal block I (1b2) opposite to the non-metal block II (1b3), there is a recessed location cavity I (1b2a). On the corresponding side of the non-metal block II (1b3), there is a recessed location cavity II (1b3a). The sprocket (2) is located between the location cavity I (1b2a) and the location cavity II (1b3a), and both ends of the chain (3) stretch downward, out of the opening (1b4) at the connecting part between the non-metal block I (1b2) and the non-metal block II (1b3). The right half housing (1b) is connected to the hook (16) through a universal joint. There are recesses (1b5) on the top of the non-metal block I (1b2) and the non-metal block II (1b3). The inner steel plate (14) and outer steel plate (10) are located on both sides on the recesses (1b5) and form an installation cavity. The lower end of the universal joint is located in the installation cavity and hinged with the inner steel plate (14) and the outer steel plate (10). The universal joint comprises the hinge I (21) and the hinge II (22). The hinge I (21) is hinged with the hinge II (22) through the shaft (23). The hinge I (21), the inner steel plate (14) and the outer steel plate (10) are hinged through the pin (20). The shaft (23) is perpendicular to the pin (20). The link rod (15) is connected to the hinge II (22). The lower end of the link rod (15) inserts into a hole on the hinge II (22), and a lug (24) with a bigger outer diameter than the hole on the hinge II (22) is set on the lower end of link rod (15). The upper end of the link rod (15) is hinged with the hook (16). As shown in FIG. 12 and FIG. 15, both of the worm (4) and the worm gear (5) are fixed inside the left half housing (1a). Here, the worm (4) is set in the left half housing (1a). The worm gear (5) is just below the worm (4) and mesh with the worm (4). One end of the worm (4) stretches out of the left half housing (1a) and that end has a rotating part (4a) able to connect to a tool. The first sliding bearing ring (51) and the second sliding bearing ring (52), made of plastic, are set to the two ends of the worm gear (5). The first sliding bearing ring (51) is fixed between the outer cover (1a2) and the side of the worm gear (5), and the second sliding bearing ring (52) is fixed between the inner steel plate (14) and the other side of the worm gear (5). Such a structure for the installation of the worm gear is applicable for the securing with fasteners, and easy for the integral installation of the left half housing (1a) and the right half housing (1b).

The description of the preferred embodiments above serves only as an illustration of the spirit of the invention. It will be understood by those skilled in the art that various changes or supplements or the adoption of similar fashions may be made therein without departing from the spirit and scope of the invention as defined by the appended claims.

LIST OF REFERENCE NUMERALS

1 Housing
1a Left Half Housing
1a1 Installation Rack
1a2 Outer Cover
1a4 Boss
1b Right Half Housing
1b1 Installation Hole
1b2 Non-metal block I
1b2a Location Cavity I
1b2b Installation Hole I
1b2c Gap I
1b3 Non-metal block II
1b3a Location Cavity II
1b3b Installation Hole II
1b3c Gap II
1b4 Opening
1b5 Recess
2 Sprocket
3 Chain
4 Worm
4a Rotating Part
5 Worm Gear
51 First Sliding Bearing Ring
52 Second Sliding Bearing Ring
6 Spline Shaft
7 Display Screen
8 Bushing
9 Fastener
10 Outer Steel Plate
10a Embedding Part
10b Through Hole
11 Force Sensor
12 Guiding Part
13 Spring
14 Inner Steel Plate
15 Link Rod
16 Hook
17 Screw
18 Rotation Sleeve
19 Reset Spring
20 Pin
21 Hinge I
22 Hinge II
23 Shaft
24 Lug

What is claimed is:

1. A chain load binder, comprising:
    a housing (1) with an inner cavity and a sprocket (2) set inside the housing (1), the housing (1) having a left half housing (1a) and a right half housing (1b) connected to each other;
    a chain (3) winding around the sprocket (2), the chain (3) having two ends;
    a worm (4), a spline shaft (6), and a worm gear (5) meshing with the worm (4) are also within the housing (1), the sprocket (2) is opposite the worm gear (5);
    two ends of the spline shaft (6) connected to the worm gear (5) and the sprocket (2) respectively; and
    a first end of the worm (4) stretches out of a housing side face and on the first end of the worm (4) there is a rotating part (4a) capable of being connected to tools;
    wherein the left half housing (1a) is made of a metal material, inside which the worm (4) and the worm gear (5) are fixed;
    wherein the right half housing (1b) is made of a non-metal solid material, inside which the sprocket (2) is installed;
    wherein both ends of the chain (3) stretch out of a bottom of the right half housing (1b);
    wherein there is an inner steel plate (14) installed inside the right half housing (1b), attaching to its (1b) inner surface;
    wherein there is an outer steel plate (10) installed outside the right half housing (1b), attaching to its (1b) outer surface; and
    wherein the left half housing (1a) and the outer steel plate (10) are secured with fasteners (9) passing through the left half housing (1a), the inner steel plate (14), the right half housing (1b), and the outer steel plate (10) successively.

2. The chain load binder as claimed in claim 1, wherein there are several through installation holes (1b1) on the outer face of the right half housing (1b);
    wherein a bushing (8) is installed inside each installation hole (1b1); and
    wherein on the outer steel plate (10), at positions corresponding to the installation holes (1b1), there are round and embedding parts (10a), the embedding parts (10a) are inserted into the installation holes (1b1) and ends of the fasteners (9) are screwed into the embedding parts (10a).

3. The chain load binder as claimed in claim 2, wherein the right half housing (1b) comprises a non-metal block I (1b2) and a non-metal block II (1b3), the non-metal block I (1b2) and the non-metal block II (1b3) are of plate shape and installed parallel to the left half housing (1a), the non-metal block I (1b2) and the non-metal block II (1b3) are opposite to each other, the inner steel plate (14) is attached to the non-metal block II (1b3), the outer steel plate (10) is attached to the non-metal block I (1b2), the bushing (8) passes through the non-metal block I (1b2) and into the non-metal block II (1b3), and the sprocket (2) is located between the non-metal block I (1b2) and the non-metal block II (1b3).

4. The chain load binder as claimed in claim 3, wherein on a side of the non-metal block I (1b2) opposite to the non-metal block II (1b3), there is a recessed location cavity I (1b2a);
    wherein on the corresponding side of the non-metal block II (1b3), there is a recessed location cavity II (1b3a);
    wherein the sprocket (2) is located between the location cavity I (1b2a) and the location cavity II (1b3a); and
    wherein both ends of the chain (3) stretch downward, out of a connecting part between the non-metal block I (1b2) and the non-metal block II (1b3).

5. The chain load binder as claimed in claim 4, wherein a link rod (15) is installed on a top of the right half housing (1b), an inner end of the link rod (15) is clamped between the non-metal block I (1b2) and the non-metal block II (1b3), an outer end of the link rod (15) is connected to a hook (16), the inner end of the link rod (15) is fixed to the right half housing (1b) with a screw (17) installed inside the outer steel plate (10).

6. The chain load binder as claimed in claim 4, wherein a force sensor (11) is installed on a second end of the worm (4), which does not stretch out of the housing (1);
   wherein a display screen (7) is set on a side of the right half housing (1b), which is connected to the force sensor (11), and is able to display the numerical values detected by the force sensor (11); and
   wherein the display screen (7) is firmly clamped between the non-metal block I (1b2) and the non-metal block II (1b3).

7. The chain load binder as claimed in claim 6, wherein the display screen (7) is rectangular, the non-metal block I (1b2) has a gap I (1b2c) on its side, the non-metal block II (1b3) has a gap II (1b3c) on its side, the display screen (7) is located between gap I (1b2c) and gap II (1b3c), and a shape enclosed by the gaps fits a shape of the display screen (7).

8. The chain load binder as claimed in claim 4, wherein the bushing (8) is made of metal material.

9. The chain load binder as claimed in claim 3, wherein a link rod (15) is installed on a top of the right half housing (1b), an inner end of the link rod (15) is clamped between the non-metal block I (1b2) and the non-metal block II (1b3), an outer end of the link rod (15) is connected to a hook (16), the inner end of the link rod (15) is fixed to the right half housing (1b) with a screw (17) installed inside the outer steel plate (10).

10. The chain load binder as claimed in claim 3, wherein a force sensor (11) is installed on a second end of the worm (4), which does not stretch out of the housing (1);
    wherein a display screen (7) is set on a side of the right half housing (1b), which is connected to the force sensor (11), and is able to display the numerical values detected by the force sensor (11); and
    wherein the display screen (7) is firmly clamped between the non-metal block I (1b2) and the non-metal block II (1b3).

11. The chain load binder as claimed in claim 10, wherein the display screen (7) is rectangular, the non-metal block I (1b2) has a gap I (1b2c) on its side, the non-metal block II (1b3) has a gap II (1b3c) on its side, the display screen (7) is located between gap I (1b2c) and gap II (1b3c), and a shape enclosed by the gaps fits a shape of the display screen (7).

12. The chain load binder as claimed in claim 3, wherein the bushing (8) is made of metal material.

13. The chain load binder as claimed in claim 2, wherein the bushing (8) is made of metal material.

14. The chain load binder as claimed in claim 2, wherein the bushing (8) is made of metal material.

15. The chain load binder as claimed in claim 1, wherein there are several through installation holes (1b1) on the outer face of the right half housing (1b);
    wherein on the outer steel plate (10), there are through holes (10b) at positions corresponding to the installation holes (1b1); and
    wherein the fasteners (9) pass through through holes on the left half housing (1a), through holes on the inner steel plate (14), installation holes (1b1) on the right half housing (1b), through holes (10b) on the outer steel plate (10), and out of an end of the outer steel plate (10), where the fasteners (9) are fixed.

16. The chain load binder as claimed in claim 15, wherein the right half housing (1b) comprises a non-metal block I (1b2) and a non-metal block II (1b3), the non-metal block I (1b2) and the non-metal block II (1b3) are of plate shape and installed parallel to the left half housing (1a), the non-metal block I (1b2) and the non-metal block II (1b2) are opposite to each other, the inner steel plate (14) is attached to the non-metal block II (1b3), the outer steel plate (10) is attached to the non-metal block I (1b2), the sprocket (2) is located between the non-metal block I (1b2) and the non-metal block II (1b3).

17. The chain load binder as claimed in claim 16, wherein on the side of the non-metal block I (1b2) opposite to the non-metal block II (1b3), there is a recessed location cavity I (1b2a);
    wherein on a corresponding side of the non-metal block II (1b3), there is a recessed location cavity II (1b3a); and
    wherein the sprocket (2) is located between the location cavity I (1b2a) and the location cavity II (1b3a), and two ends of the chain (3) stretch downward, out of an opening (1b4) at a connecting part between the non-metal block I (1b2) and the non-metal block II (1b3).

18. The chain load binder as claimed in claim 17, wherein the right half housing (1b) is connected to a hook (16) through a universal joint, there are recesses (1b5) on a top of the non-metal block I (1b2) and the non-metal block II (1b3), the inner steel plate (14) and the outer steel plate (10) are located on two sides on the recesses (1b5) and form an installation cavity, a lower end of the universal joint is located in the installation cavity and hinged with the inner steel plate (14) and the outer steel plate (10).

19. The chain load binder as claimed in claim 18, wherein the universal joint comprises a hinge I (21) and a hinge II (22);
    wherein the hinge I (21) is hinged with the hinge II (22) through a shaft (23);
    wherein the hinge I (21), the inner steel plate (14), and the outer steel plate (10) are hinged through a pin (20);
    wherein the shaft (23) is perpendicular to the pin (20);
    wherein a link rod (15) is connected to the hinge II (22);
    wherein a lower end of the link rod (15) inserts into a hole on the hinge II (22), and a lug (24) with a bigger outer diameter than the hole on the hinge II (22) is set on the lower end of the link rod (15); and
    wherein an upper end of the link rod (15) is hinged with the hook (16).

20. The chain load binder as claimed in claim 19, wherein the left half housing (1a) comprises an installation rack (1a1) and an outer cover (1a2), an upper part of the installation rack (1a1) is rectangular, and a lower part has bosses (1a4) protruding above the upper part and the fasteners (9) are located at the bosses (1a4).

* * * * *